United States Patent
Park

(10) Patent No.: US 10,625,641 B2
(45) Date of Patent: Apr. 21, 2020

(54) GYRO SEAT AND VEHICLE INCLUDING THE SAME

(71) Applicants: HYUNDAI MOTOR COMPANY, Seoul (KR); KIA MOTORS CORPORATION, Seoul (KR)

(72) Inventor: Jong-Min Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 224 days.

(21) Appl. No.: 15/834,717

(22) Filed: Dec. 7, 2017

(65) Prior Publication Data

US 2018/0334062 A1 Nov. 22, 2018

(30) Foreign Application Priority Data

May 16, 2017 (KR) .................. 10-2017-0060602

(51) Int. Cl.
*B60N 2/50* (2006.01)
*B60N 2/02* (2006.01)

(52) U.S. Cl.
CPC ............ *B60N 2/501* (2013.01); *B60N 2/504* (2013.01); *B60N 2002/0268* (2013.01); *B60Y 2400/301* (2013.01); *B60Y 2400/404* (2013.01)

(58) Field of Classification Search
CPC .......... B60N 2/39; B60N 2/995; B60R 16/037
See application file for complete search history.

(56) References Cited

U.S. PATENT DOCUMENTS

| 9,528,567 | B2 | 12/2016 | Robbins et al. | |
| 9,902,300 | B2* | 2/2018 | Hein | B60N 2/39 |
| 2006/0186721 | A1* | 8/2006 | Flory | B60N 2/995 |
| | | | | 297/423.36 |
| 2014/0333103 | A1* | 11/2014 | Lee | B60N 2/42736 |
| | | | | 297/216.19 |
| 2016/0297337 | A1* | 10/2016 | White | B60N 2/2209 |
| 2017/0253252 | A1* | 9/2017 | Donnelly | B60W 50/0098 |
| 2017/0253254 | A1* | 9/2017 | Sweeney | B60W 50/16 |
| 2018/0037139 | A1* | 2/2018 | Patrick | B60N 2/0248 |
| 2018/0215318 | A1* | 8/2018 | Abdel Majid | B60N 2/933 |

FOREIGN PATENT DOCUMENTS

| JP | S63140141 A | 6/1988 |
| KR | 10-0494584 B1 | 6/2005 |
| KR | 10-1466498 B1 | 12/2014 |
| KR | 10-2016-0087854 A | 7/2016 |
| WO | WO-2019013726 A2 * | 1/2019 |

* cited by examiner

*Primary Examiner* — Peter D Nolan
*Assistant Examiner* — Ce Li Li
(74) *Attorney, Agent, or Firm* — Morgan, Lewis & Bockius LLP

(57) ABSTRACT

A gyro seat includes: a seat body comprising a seat cushion and a seat back coupled to the seat cushion; and a seat gyroscope mounted to the seat body, the seat gyroscope compensating a movement of the seat body by control of first, second and third axes, where the first axis corresponds to a yaw of the seat body as a z axis of an xyz coordinate system, the second axis corresponds to a pitch of the seat body as an x axis of the xyz coordinate system, and the third axis corresponds to a roll of the seat body as a y axis of the xyz coordinate system.

16 Claims, 10 Drawing Sheets

ELECTROMAGNET -TYPE SEAT FIXING FORCE (A)

② MAGNETIC PATH CONTROL (SEAT FIXING)

MAGNETIC HOLDING-TYPE SEAT FIXING FORCE (B)

GYRO SEAT AND VEHICLE INCLUDING THE SAME

CROSS-REFERENCE(S) TO RELATED APPLICATIONS

This application claims the benefit of priority to Korean Patent Application No. 10-2017-0060602, filed on May 16, 2017 in the Korean Intellectual Property Office, the entirety of which is incorporated herein by reference.

TECHNICAL FIELD

The present disclosure relates to a seat, and more particularly, to a vehicle having a gyro seat that does not reduce convenience of a driver in an autonomous driving mode.

BACKGROUND

Recently, autonomous driving technology adopted for a vehicle is becoming more widely used, because it provides convenience to a driver because there is no need to drive directly.

Furthermore, regarding the convenience of the driver provided by the autonomous driving vehicle, autonomous driving allows the driver to read a book, watch a movie, apply makeup, play a game, use a hand-held phone and the like which the driver could not do in a self-driving mode.

Accordingly, the autonomous driving vehicle is being developed for maximizing the automation of the autonomous driving technology.

However, the autonomous driving vehicle also may have a reverse effect that decreases the convenience of the driver.

As one example, the reverse effect may cause severe motion sickness to passengers (that is, a driver and a passenger) in an autonomous driving mode by not doing a self-driving in which the driver was immersed even in one abnormal behavior, and thus making differently balance, reaction, and vision and the like of a human body unlike in a self-driving mode. Particularly, a behavior tendency of the passengers (that is, a driver and a passenger) riding the autonomous driving vehicle, such as reading a book, sending a text-message of a hand-held phone, watching TV and movie, playing a game and the like, easily causes motion sickness, and thus the phenomenon of causing motion sickness is being emerged as a problem to be necessarily improved.

Accordingly, the autonomous driving vehicle also requires alleviation of the reverse effect as much as maximization of the convenience.

The contents described in Description of Related Art are to help the understanding of the background of the present disclosure, and may include what is not previously known to those skilled in the art to which the present invention pertains.

SUMMARY

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

The present disclosure provides a gyro seat and a vehicle having the same performing a seat operation according to an autonomous driving, thus preventing the reverse effect of causing motion sickness contrary to convenience of the autonomous driving even in passenger's behavior causing motion sickness, and particularly, improving more convenience of the autonomous driving through diversification of a seat posture variation, a seat unfolding, a seat folding, and a seat position movement.

The gyro seat according to an exemplary embodiment of the present disclosure is characterized by comprising: a seat body comprising a seat cushion and a seat back coupled to the seat cushion; and a seat gyroscope mounted to the seat body, the seat gyroscope compensating a movement of the seat body by control of first, second and third axes, where the first axis corresponds to a yaw of the seat body as a z axis of an xyz coordinate system, the second axis corresponds to a pitch of the seat body as an x axis of the xyz coordinate system, and the third axis corresponds to a roll of the seat body as a y axis of the xyz coordinate system.

As an exemplary embodiment, the seat gyroscope comprises a gyro sensor measuring displacement, an angular velocity, and an angular acceleration of the first axis, the second axis, and the third axis, respectively; and a gyro motor whose operation for a seat posture control of the seat body is performed based on the gyro sensor. The seat gyroscopes comprise the gyro sensor and the gyro motor, respectively and comprise a first axis seat gyroscope operating as the first axis, a second axis seat gyroscope operating as the second axis, and a third axis seat gyroscope operating as the third axis.

As an exemplary embodiment, each of the first, the second, and the third axis seat gyroscopes comprises a mounting bracket coupled with the seat body. The mounting bracket of the first axis seat gyroscope is coupled in a height direction of the seat body to be the first axis; the mounting bracket of the second axis seat gyroscope is coupled in a longitudinal direction of the seat body to be the second axis; and the mounting bracket of the third axis seat gyroscope is coupled in a width direction of the seat body to be the third axis.

As an exemplary embodiment, the seat body further comprises a leg actuator forming a fourth axis and controlling an unfolding operation of the seat leg; and a folding actuator forming a fifth axis and controlling a folding operation of the seat back.

As an exemplary embodiment, the seat body further comprises a magnet forming a sixth axis for movement of the x axis and a seventh axis for movement of the y axis; and the magnet performs, in a repulsive force, the movement of the seat body according to the sixth axis and the seventh axis, while it performs, in an attractive force and a magnetic holding, a fixing according to moving stop of the seat body.

As an exemplary embodiment, the magnet comprises a seat electromagnet and a floor electromagnet which a current supply is controlled for conversion of N pole and S pole; and a seat permanent magnet mounted to the seat body and positioned under the seat electromagnet. The seat electromagnet is mounted to the seat body; the floor electromagnet is mounted in an outside of the seat body to face the seat body and forms a grid pattern of the N pole and the S pole arranged in a moving space of the seat body; and the permanent magnet is mounted to the seat body and arranged to face the seat electromagnet and the floor electromagnet, respectively.

As an exemplary embodiment, the seat body comprises a rotation motor and the rotation motor generates a torque for rotation of the seat body.

As an exemplary embodiment, the seat body comprises a seat motion controller and the seat motion controller controls the seat gyroscope upon variations of the yaw, the pitch, and the roll.

And, a vehicle according to the present disclosure for achieving the above object is characterized by comprising a gyro seat configured to: control a yaw, a pitch, and a roll, respectively varied in a driving mode and performing a seat posture control of a seat cushion; perform an unfolding control of a seat leg mounted to the seat cushion; perform a folding control of a seat back mounted to the seat cushion; and perform a seat moving control of the seat cushion with respect to a floor; and a seat motion controller performing the seat posture control; the unfolding control; the folding control; and the seat moving control.

As an exemplary embodiment, the vehicle may further comprise first, the second, and the third seat gyroscopes, where each of the first, the second, and the third seat gyroscopes comprises a gyro sensor detecting variations of the yaw, the pitch, and the roll and a gyro motor controlling the yaw, the pitch, and the roll; and the seat motion controller performs the seat posture control by an operating control of the gyro motor based on the gyro sensor.

As an exemplary embodiment, the vehicle may further comprise a leg actuator and a folding actuator; and the seat motion controller performs the unfolding control by an operating control of the leg actuator and the folding control by an operating control of the folding actuator.

As an exemplary embodiment, the vehicle may further comprise a seat electromagnet, floor electromagnet, and seat permanent magnet; and the seat permanent magnet may be interposed between the seat electromagnet and the floor electromagnet and form a polarity conversion of N-N poles and N-S poles and a magnetic path conversion for a position movement and a position fixing of the seat moving control.

As an exemplary embodiment, the gyro seat comprises a seat rotation device; and the seat rotation device comprises a rotation motor rotated by a control of the seat motion controller, a gear box receiving a rotational force of the rotation motor and rotating the gyro seat, and a damper added to the rotation motor.

As an exemplary embodiment, the seat motion controller comprises an input processor processing, as an input data, varied values of the yaw, the pitch, and the roll and a detected value of a vehicle sensor; a main processor generating control values for performing the seat posture control, the unfolding control, the folding control, and the seat moving control; and an output processor outputting the control values.

A vehicle applying a gyro seat according to the present disclosure achieves the following advantages and effects.

Firstly, it is advantageous to prevent occurrence of motion sickness by a seat movement even in driver's behavior causing motion sickness in an autonomous driving mode, thus not reducing convenience of the driver. Secondly, it is advantageous to completely alleviating vibration of passengers that should be necessarily occurred by variation of a vehicle driving condition regardless of a conventional vehicle and an autonomous driving vehicle. Thirdly, it is possible to read a book, watch a movie, apply makeup, play a game, use a hand-held phone without occurrence of motion sickness in an autonomous driving vehicle which is being widely generalized. Fourthly, it is possible to contribute to generalization of the autonomous driving vehicle through the improvement for convenience of the passenger and to dominate technology supremacy. Fifthly, it is possible to perform a seat posture control by a seat gyroscope-based motor control, thus maximizing precision and convenience through measurement of displacements, angular velocities, and angular accelerations of xyz axes of the gyro sensor. Sixthly, it is possible to independently perform the seat posture control based on the seat gyroscope, thus leading seat and design technologies for the autonomous driving vehicle using a leading original mobility technology. Seventhly, it is possible to alleviate a phenomenon of causing motion sickness to the passenger in the autonomous driving vehicle without depending on an autonomous driving technology, thus expanding a development direction of an autonomous driving technology into two tracks.

DESCRIPTION OF SPECIFIC EMBODIMENTS

Reference should be made to the accompanying drawings that illustrate an exemplary embodiments of the present disclosure, and to the description in the accompanying drawings in order to fully understand the present disclosure, operational advantages of the present disclosure, and objects attained by practicing the present disclosure.

In certain embodiments, known technologies or detailed descriptions may be reduced or omitted to avoid obscuring appreciation of the disclosure by those skilled in the art.

Figure 1:
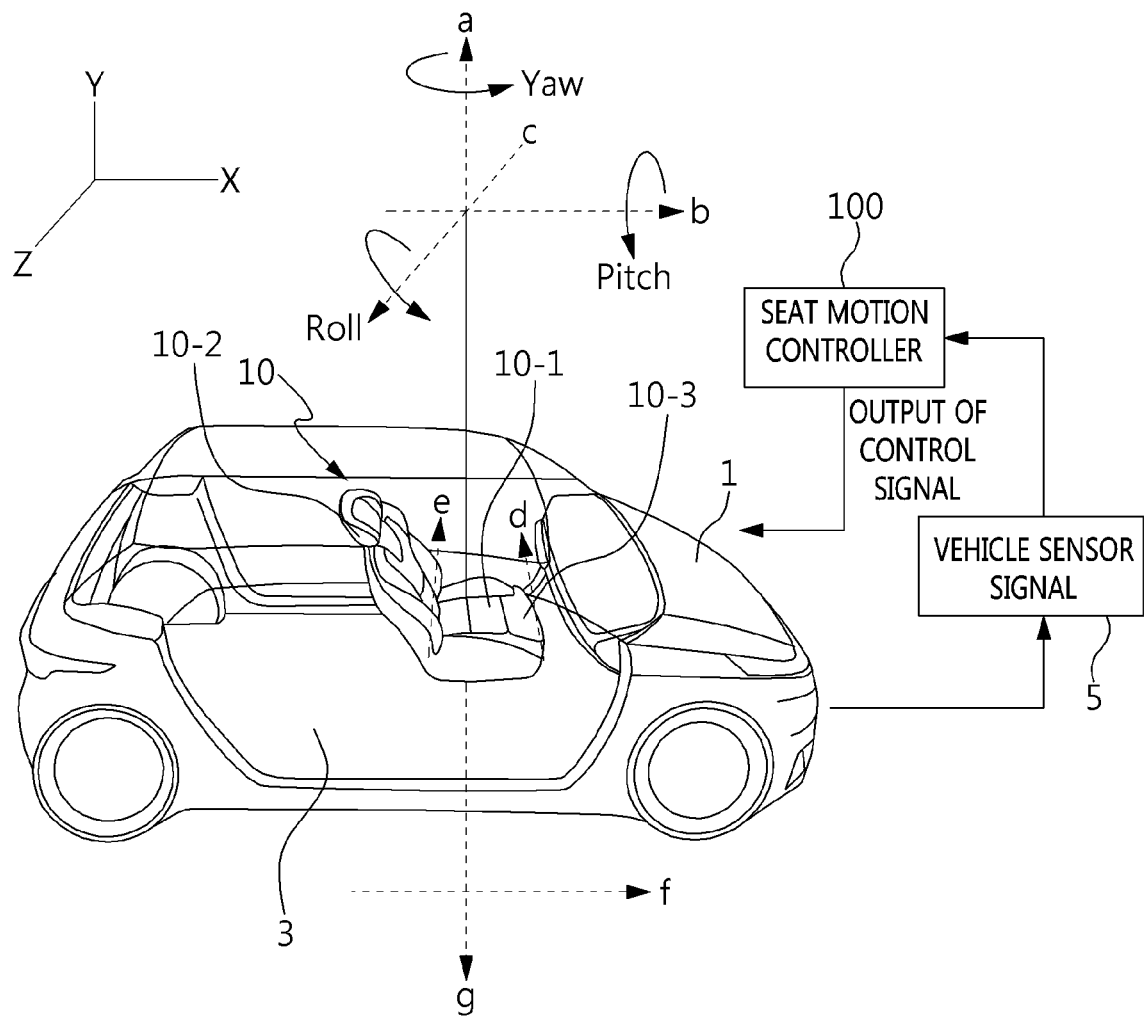
FIG. 1 is a view illustrating a configuration of a vehicle having a gyro seat according to an exemplary embodiment of the present disclosure.

Referring to FIG. 1, a vehicle 1 comprises a gyro seat 10 installed on a floor 3 and a seat motion controller 100 receiving a detected signal of a vehicle sensor 5 as an input data and performing an operating control of the gyro seat 10. Hereinafter, a driver means a driver or a passenger taking the gyro seat.

As one embodiment, the vehicle 1 comprises all vehicles requiring the gyro seat 10, such as a 2-door vehicle, a 4-door vehicle, a van, and a bus and the like. In this case, the vehicle 1 describes only the gyro seat 10 for the driver for describing an operation of the gyro seat 10 for the convenience of explanation, and the gyro seat 10 has the same seat arrangement as that of a conventional vehicle. And, the floor 3 forms a bottom of the vehicle 1 and is associated with a position movement in every direction of the gyro seat 10. Further, the vehicle sensor 5 is installed in the vehicle 1 to detect a driving information of the vehicle 1 and comprises a GPS receiver, a geomagnetic sensor, and an acceleration sensor.

As one embodiment, the gyro seat 10 comprises seven of first, second, third, fourth, fifth, sixth, and seventh axes (a, b, c, d, e, f, g) performing a seat motion. The first axis (a) reflects a yaw of the vehicle 1 to the gyro seat 10; the second axis (b) reflects a pitch of the vehicle 1 to the gyro seat 10; the third axis (c) reflects a roll of the vehicle 1 to the gyro seat 10; the fourth axis (d) reflects a leg position of a driver to the gyro seat 10; the fifth axis (e) reflects a seated posture of the driver to the gyro seat 10; the sixth axis (f) reflects a front-to-back interval of the driver to the gyro seat 10; and the seventh axis (g) reflects a left-to-right interval of the driver to the gyro seat 10.

As one embodiment, the seat motion controller 100 receives a vehicle sensor signal detected in the vehicle sensor 5 as an input data; processes the input data; and performs a seat posture control and a seat position control of the gyro seat 10. Accordingly, the seat motion controller 100 is configured to network with an engine control unit or a controller for a vehicle and the like through a Blue Link or a Controller Area Network (CAN) communication.

Figure 2:
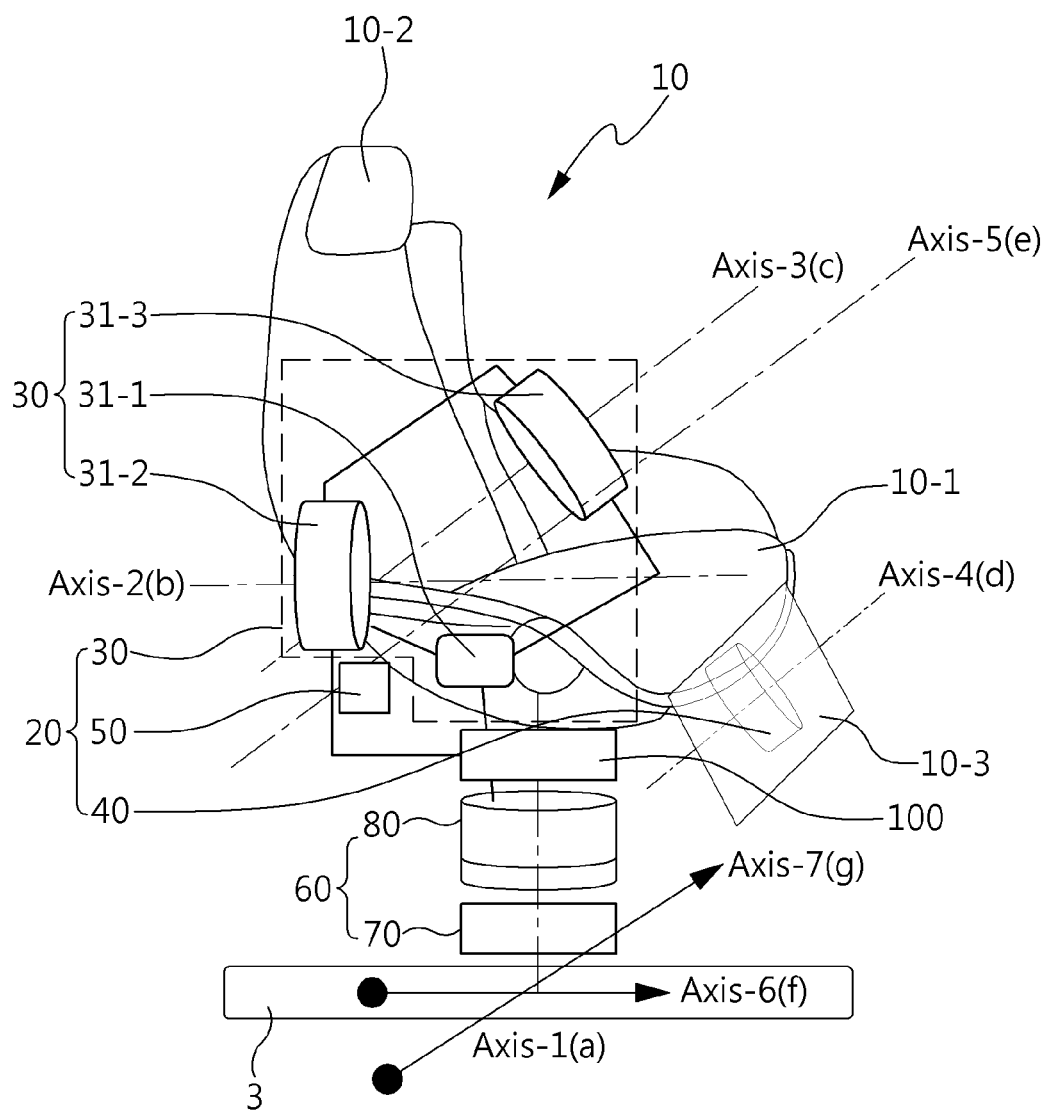
FIG. 2 is a view illustrating a configuration of a seat posture control system and a seat position control system applied to the gyro seat according an exemplary embodiment of the present disclosure.

Referring to FIG. 2, the gyro seat 10 comprises a seat body, a seat posture control system 20, and a seat position control system 60.

As one embodiment, the seat body comprises a seat cushion 10-1 for seating of a driver, a seat back 10-2 for back of the driver, and a seat leg 10-3 for putting on legs of the driver. As such, the seat body has the same seat as that of a conventional vehicle. However, the seat body further comprises a seat frame 10-4 (refer to FIG. 9) integrating the seat cushion 10-1 and the seat back 10-2; and the seat frame 10-4 provides a seat stiffness that prevents vibration from movement of the vehicle 1 caused by a yaw, a pitch, and a roll at a status that the gyro seat 10 is mounted on the floor 3.

As one embodiment, the seat posture control system 20 comprises a seat three-axis control device 30 mounted to the seat cushion 10-1, a seat leg device 40 mounted to the seat leg 10-3, and a seat folding device 50 mounted to the seat back 10-2.

In this case, the seat three-axis control device 30 comprises a seat gyroscope 31 comprising a first axis seat gyroscope 31-1 following the yaw, a second axis seat gyroscope 31-2 following the pitch, and a third axis seat gyroscope 31-3 following the roll; operates the first axis seat gyroscope 31-1 as the first axis (a); the second axis seat gyroscope 31-2 as the second axis (b), and the third axis seat gyroscope 31-3 as the third axis (c); and controls posture of the seat cushion 10-1 according to the yaw, the pitch, and the roll of the vehicle 1. The seat leg device 40 forms the fourth axis (d) and controls unfolding of the seat leg 10-3 according to the yaw, the pitch, and the roll of the vehicle 1. The seat folding device 50 forms the fifth axis and controls a folding of the seat back 10-2 according to the yaw, the pitch, and the roll of the vehicle 1.

As one embodiment, the seat position control system 60 comprises a seat moving device 70 and a seat rotation device 80.

In this case, the seat moving device 70 forms the sixth and seventh axes (f, g) together with the floor 3 of the vehicle 1 and controls a position in every direction of the gyro seat 10 according to the yaw, the pitch, and the roll of the vehicle 1. The seat rotation device 80 is fixed to the seat frame 10-4 (refer to FIG. 9) and controls 360 degrees rotation of the gyro seat 10 according to the yaw, the pitch, and the roll of the vehicle 1.

Figure 3:
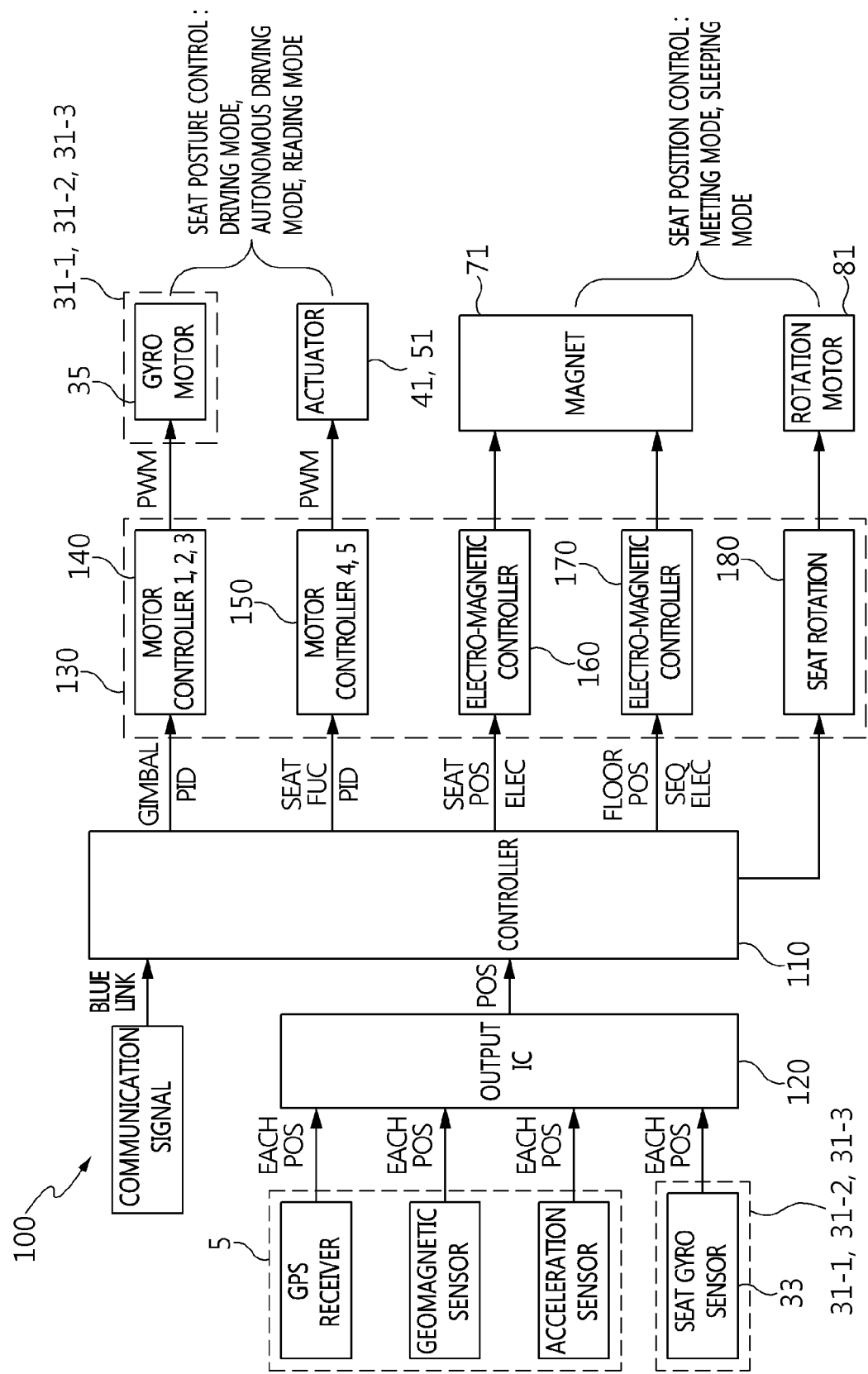
FIG. 3 is a block diagram illustrating a seat motion controller for the gyro seat according to an exemplary embodiment of the present disclosure.

Referring to FIG. 3, the seat motion controller 100 comprises a main processor 110, an input processor 120, and an output processor 130.

As one embodiment, the main processor 110 receives a detected value sent from the input processor 120 as an input data; calculates and generates a control value for a seat posture control and a seat moving control, respectively, by the rotation of the gyro seat 10 and the first, the second, the third, the fourth, the fifth, the sixth, and the seventh axes, respectively; and provides each of the generated control values to the output processor 130 as an output data. Accordingly, the main processor 110 embeds, as a control logic, an autonomous interlocking-type gyro seat logic, which generates an input value as a control value and converts the control value into an output value. Particularly, the main processor 110 uses a BLUE LINK as a communication signal and communicates with an engine control unit mounted in the vehicle 1 or other controller mounted therein, thus achieving a network of the seat motion controller 100.

As one embodiment, the input processor 120 receives each of detected values from a GPS receiver, a geomagnetic sensor, and an acceleration sensor constituting a vehicle sensor and a detected value of a gyro sensor 33 (refer to FIG. 5) included in the first, the second, and the third axis gyroscopes 31-1, 31-2, 31-3, respectively and sends the input detected values to the main processor 110.

As one embodiment, the output processor 130 comprises a gyro motor output portion 140, an actuator output portion 150, a seat magnet output portion 160, a floor magnet output portion 170, and a rotation motor output portion 180. The gyro motor output portion 140 outputs a control value of the main processor 110 applying Proportion, Integration, Differential (PID), and operates a respective gyro motor 35 of the first, the second, and the third axis gyroscopes 31-1, 31-2, 31-3 using the PID output. The actuator output portion 150 outputs the control value of the main processor 110 applying the PID and operates a respective actuator 41, 51 (refer to FIG. 7) of the seat leg device 40 and the seat folding device 50 using the PID output. The seat magnet output portion 160 converts the control value of the main processor 110 into an electric signal (e.g., On/Off signal) for a magnet 71 (refer to FIG. 9) of the seat moving device 70, and moves the gyro seat 10 in a front-to-back position. The floor magnet output portion 170 converts the control value of the main processor 110 into an electric signal (e.g., On/Off signal) for the magnet 71 (refer to FIG. 9) of the seat moving device 70, and moves the gyro seat 10 in a left-to-right position. The rotation motor output portion 180 outputs the control value of the main processor 110 applying the PID and operates a rotation motor 81 (refer to FIG. 9) of the seat rotation device 80 using the PID output.

Meanwhile, FIGS. 4 to 8 show embodiments of performing a detailed operation of the gyro seat 10 by the seat three-axis control device 30 constituting the seat posture control system 20 in a driving mode of the vehicle 1.

Figure 4:
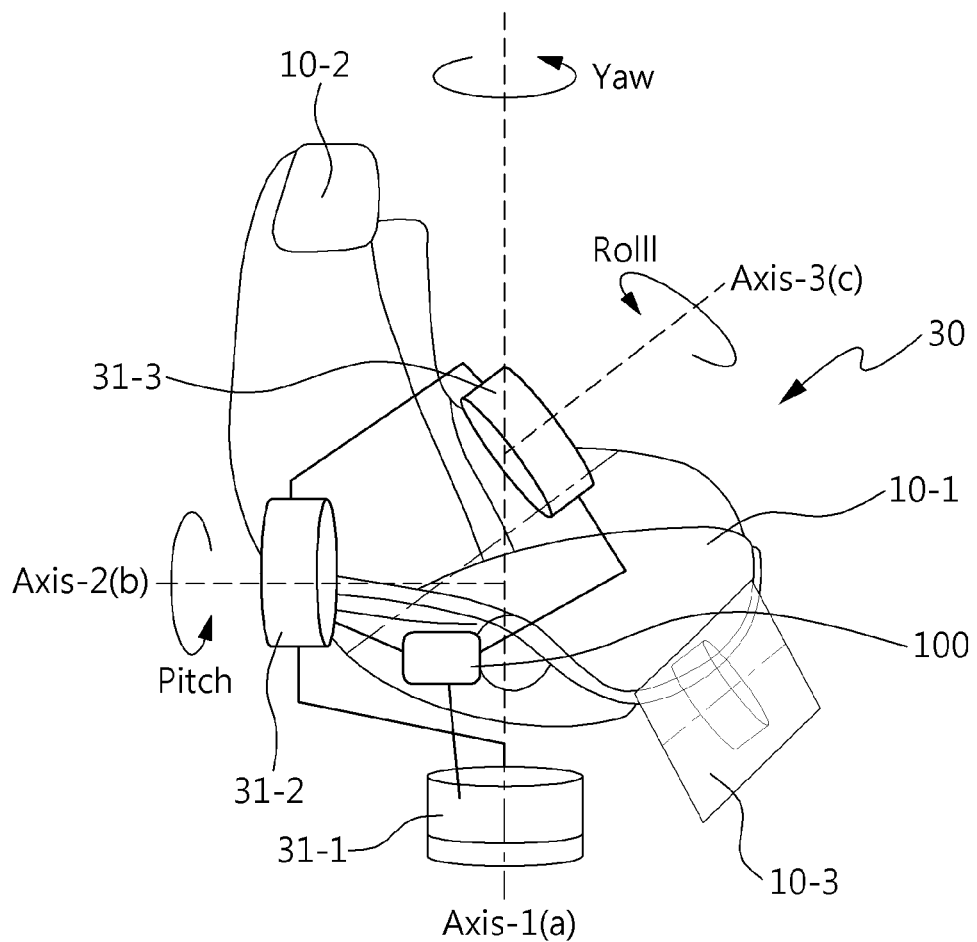
FIG. 4 is a view illustrating a configuration of a seat three-axis control device applied to the seat posture control system according to an exemplary embodiment of the present disclosure.

Referring to FIG. 4, the seat three-axis control device 30 comprises a seat gyroscope 31 mounted to the seat cushion 10-1 and maintaining an original position even if a seat is inclined by a momentum of the yaw, the pitch, and the roll of the gyro seat 10; and the seat gyroscope 31 comprises the first, the second, and the third axis seat gyroscopes 31-1, 31-2, 31-3 having a shape of gimbal. Accordingly, the first axis seat gyroscope 31-1 operates as the first axis (a) following the yaw of the vehicle 1, the second axis seat gyroscope 31-2 operates as the second axis (b) following the pitch of the vehicle 1, and the third axis seat gyroscope 31-3 operates as the third axis (c) following the roll of the vehicle 1.

Figure 5:
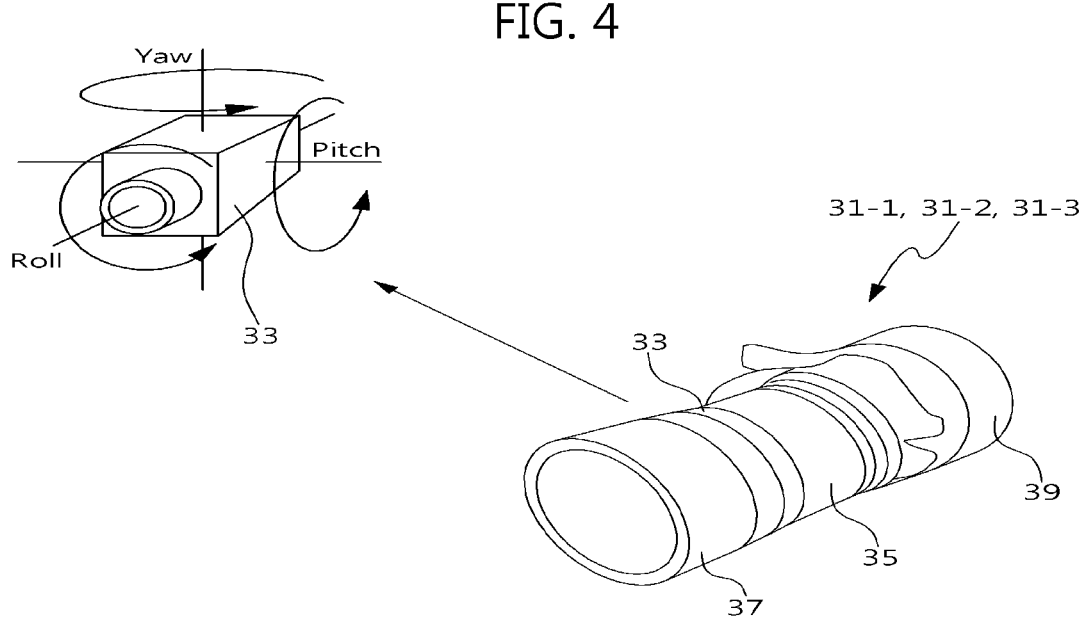
FIG. 5 is a view illustrating an embodiment of a seat gyroscope applied to the seat three-axis control device according to an exemplary embodiment of the present disclosure.

Referring to FIG. 5, the seat three-axis control device 30 comprises a gyro sensor 33, a gyro motor 35, a gyro axis 37, and a mounting bracket 39. As one embodiment, the gyro sensor 33 measures displacements, angular velocities, and angular accelerations of the xyz axes as a xyz coordinate system and detects the yaw, the pitch, and the roll of the vehicle 1 in a driving mode. The gyro motor 35 controls a bi-directional rotation using the PID output of the seat motion controller 100 which receives the detected value of the vehicle sensor 5 and the detected value of the gyro sensor 33 for performing the seat posture control through the seat gyroscope-based motor control. The gyro axis 37 performs a bi-directional rotation of the gyro motor 35; moves the seat cushion 10-1; and thus controls posture of the gyro seat 10. The mounting bracket 39 provides a space coupled as a structure integrating the gyro sensor 33, the gyro motor 35, and the gyro axis 37 and operates as the coupled portion mounted to the seat cushion 10-1.

Accordingly, each of the first, the second, and the third axis seat gyroscopes 31-1, 31-2, 31-3 constituting the seat three-axis control device 30 has the same configuration, such as the gyro sensor 33, the gyro motor 35, the gyro axis 37, and the mounting bracket 39.

However, the first axis seat gyroscope 31-1 comprises the gyro sensor 33, the gyro motor 35, the gyro axis 37, and the mounting bracket 39; arranges the mounting bracket 39 on the seat cushion 10-1 in a height direction (that is, a direction of z axis or a height direction of the seat body) of the vehicle 1; and forms the first axis seat gyroscope 31-1 as the first axis (a) of the seat three-axis control device 30. The second axis seat gyroscope 31-2 comprises the gyro sensor 33, the gyro motor 35, the gyro axis 37, and the mounting bracket 39; arranges the mounting bracket 39 on the seat cushion 10-1 in total length direction (that is, a direction of x axis or a longitudinal direction of the seat body) of the vehicle 1 and forms the second axis seat gyroscope 31-2 as the second axis (b) of the seat three-axis control device 30. The third axis seat gyroscope 31-3 comprises the gyro sensor 33, the gyro motor 35, the gyro axis 37, and the mounting bracket 39; arranges the mounting bracket 39 on the seat cushion 10-1 in a width direction (that is, a direction of y axis or a width direction of the seat body) of the vehicle 1 and forms the third axis seat gyroscope 31-3 as the third axis (c) of the seat three-axis control device 30.

Figure 6:
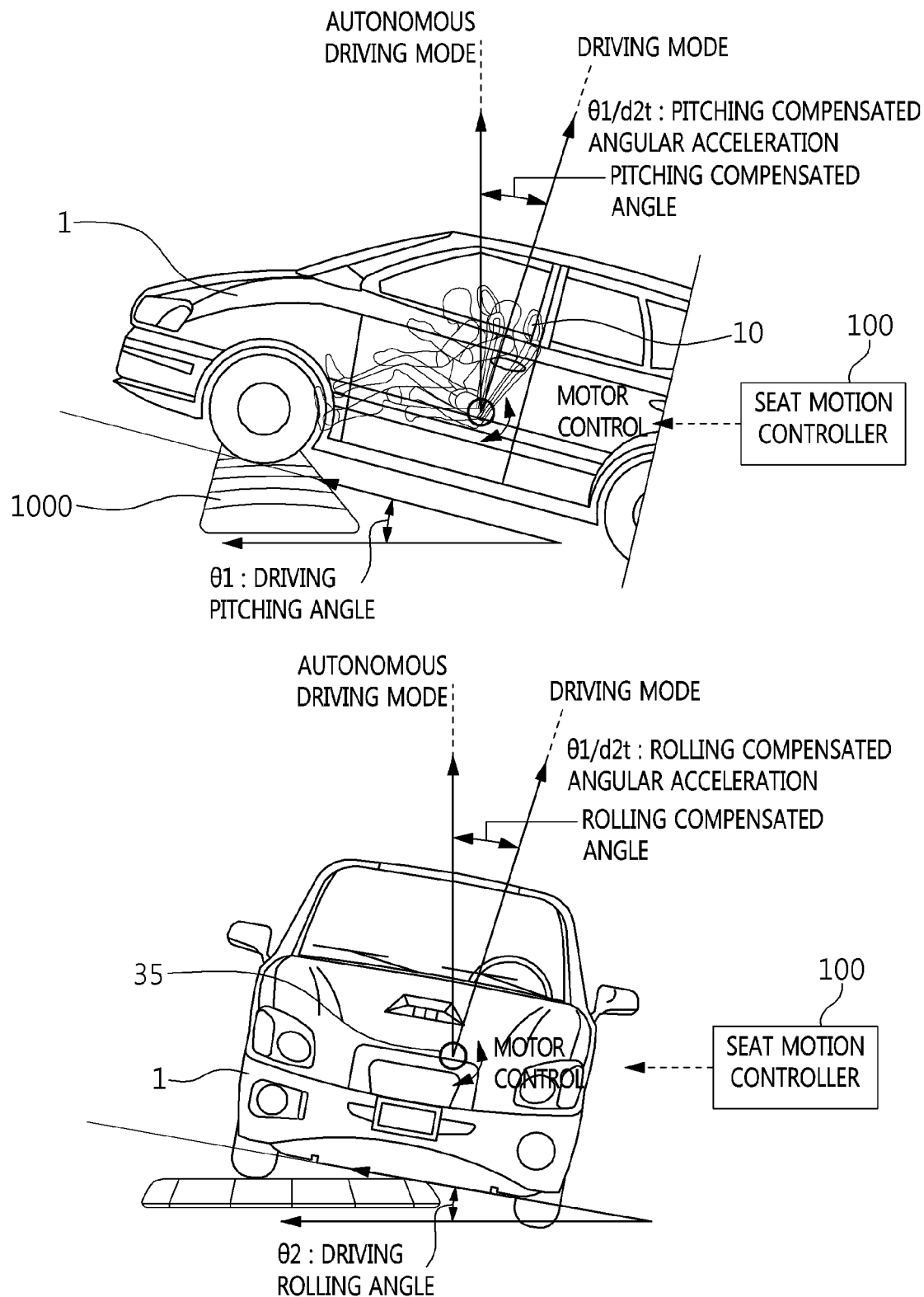
FIG. 6 is a view illustrating an operating status of the gyro seat by the seat three-axis control device in an autonomous driving mode and in a driving mode of a vehicle.

Referring to FIG. 6, a difference between an autonomous driving mode and a driving mode according to variations of the pitch and the roll of the vehicle 1 whose a left front wheel passes through a speed bump 1000 in an autonomous driving mode is shown.

In this case, when an operating control of the gyro seat 10 is not performed, the driving mode, which has variation ($\Theta 1$) of a pitching angle of the vehicle 1 by the speed bump 1000 like an embodiment of a side of the vehicle 1, makes a driver's posture leaned toward a rear of the vehicle (based on a driver's posture taking the gyro seat 10) compared to an autonomous driving mode, and at the same time, like an embodiment of the front of the vehicle 1, the driving mode, which has variation ($\Theta 2$) of a rolling angle by the speed bump 1000, makes a driver's posture leaned toward a left side of the vehicle (based on a driver's posture taking the gyro seat 10).

However, the seat motion controller 100 receives, as an input data from the input processor 120, a detected value of the vehicle sensor 5 mounted to the vehicle 1 passing through the speed bump 1000 in an autonomous driving mode and displacements, angular velocities, and angular accelerations of the xyz axes of the gyro sensor 33 of the seat three-axis control device 30; the main processor 110 processes the input data and generates, as control values, a pitching compensated angular acceleration (e.g., $\Theta 1/d2t$) and a rolling compensated angular acceleration (e.g., $\Theta 2/d2t$); and the output processor 130 controls the seat three-axis control device 30 using the pitching compensated angular acceleration and the rolling compensated angular acceleration as the PID output data, and as a result, the gyro seat 10 is performed by a seat posture control and the driver of the vehicle 1 passing through the speed bump 1000 is converted into an autonomous driving mode from a driving mode.

As one embodiment, the PID output according to the pitching compensated angular acceleration of the output processor 130 rotates the gyro motor 35 of the second axis seat gyroscope 31-2 in a counterclockwise direction (or reverse rotation) and at the same time, the PID output according to the rolling compensated angular acceleration rotates the gyro motor 35 of the third axis seat gyroscope 31-3 in a counterclockwise direction (or reverse rotation). As a result, the gyro seat 10 moves in a front direction of the vehicle by the pitching compensated angle on variation ($\Theta 1$) of the pitching angle and at the same time, moves in a right side direction of the vehicle by the rolling compensated angle on variation ($\Theta 2$) of the rolling angle, and thus a driver's posture is converted into a stable autonomous driving mode from an unstable driving mode while the vehicle 1 passes through the speed bump 1000.

And, a difference between an autonomous driving mode and a driving mode according to variations of the pitch and the roll of the vehicle 1 whose right front wheel passes over a speed bump 1000 in an autonomous driving mode is only contrary to the direction of the left front wheel and it is controlled by the same method as in the left front wheel. Further, a difference between an autonomous driving mode and a driving mode generated by variation of the yaw of the vehicle 1 is achieved by controlling, using the PID, the gyro motor 35 of the first axis seat gyroscope 31-1 by a yaw compensated angular acceleration (e.g., $\Theta 3/d2t$) on variation ($\Theta 3$) of the yaw angle detected in the gyro sensor 33 of the first axis seat gyroscope 31-1.

Figure 7:
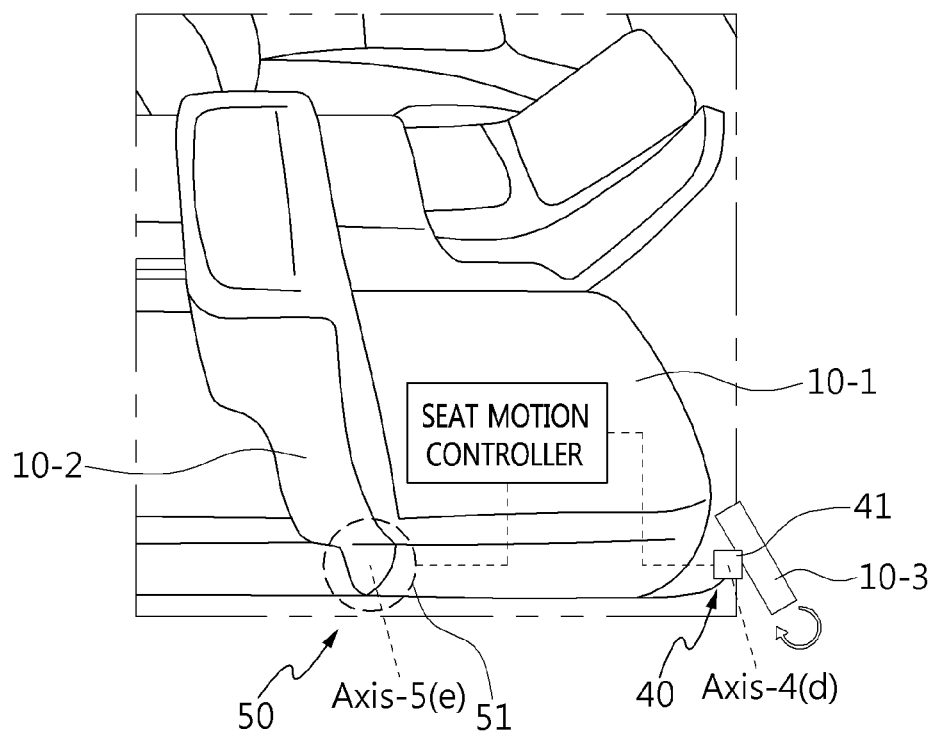
FIG. 7 is a view illustrating a configuration of a seat folding device and a seat leg device of the seat posture control system according to an exemplary embodiment of the present disclosure.

Referring to FIG. 7, the seat leg device 40 comprises a leg actuator 41 which is embedded in the seat cushion 10-1 and associated with the seat leg 10-3 hinge-coupled as a hinge-coupled axis at one end of the seat cushion 10-1; and the leg actuator 41 pushes the seat leg 10-3 from and pulls it to the seat cushion 10-1 by means of a hinge-coupled axis by a control of the seat motion controller 100. And, the seat folding device 50 comprises a folding actuator 51 which is embedded in the seat cushion 10-1 (or the seat back 10-2) and associated with the seat leg 10-2 hinge-coupled as a recycling axis at an end of an opposite side of the seat cushion 10-1; and a folding actuator 51 folds the seat back 10-2 to and unfolds it from the seat cushion 10-1 by means of the recycling axis by a control of the seat motion controller 100. Accordingly, each of the leg actuator 41 and the folding actuator 51 has the same configuration as that applied to a conventional seat.

Figure 8:
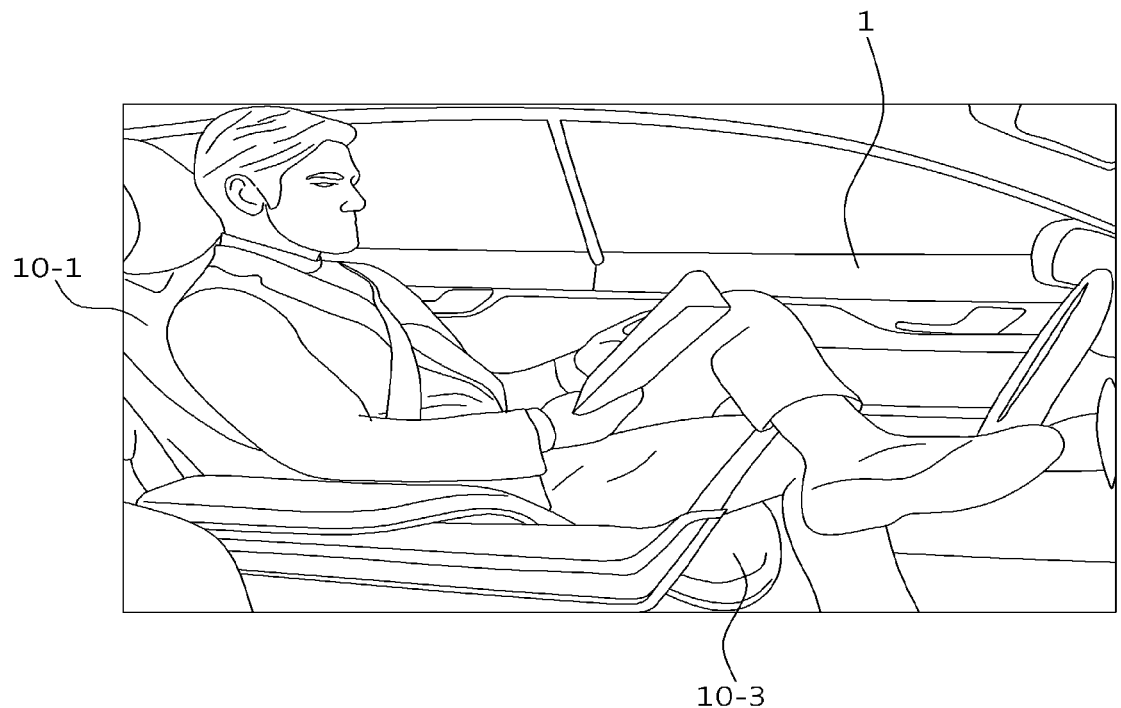
FIG. 8 is a view illustrating an operating status of the gyro seat by the seat folding device and the seat leg device in a reading mode of the vehicle according to an exemplary embodiment of the present disclosure.

Referring to a reading mode of the gyro seat 10 in FIG. 8, the seat motion controller 100 receives, as an input data from the input processor 120, a detected value of the vehicle sensor 5 and displacements, angular velocities, and angular accelerations of the xyz axes of the gyro sensor 33; the main processor 110 generates control values for operations of the leg actuator 41 and the folding actuator 51; and the output processor 130 controls movements of the leg actuator 41 and the folding actuator 51 using the PID output. As a result, the seat leg 103 is pulled by the leg actuator 41 and the seat back 10-2 is reclined by the folding actuator 51, and thus the gyro seat 10 provides a space capable of moving leg at a status that a driver is reclined. Accordingly, operating controls of the leg actuator 41 and the folding actuator 51 for the reading mode may be performed when the vehicle 1 passes through the speed bump 1000 as shown in FIG. 6.

Figure 9:
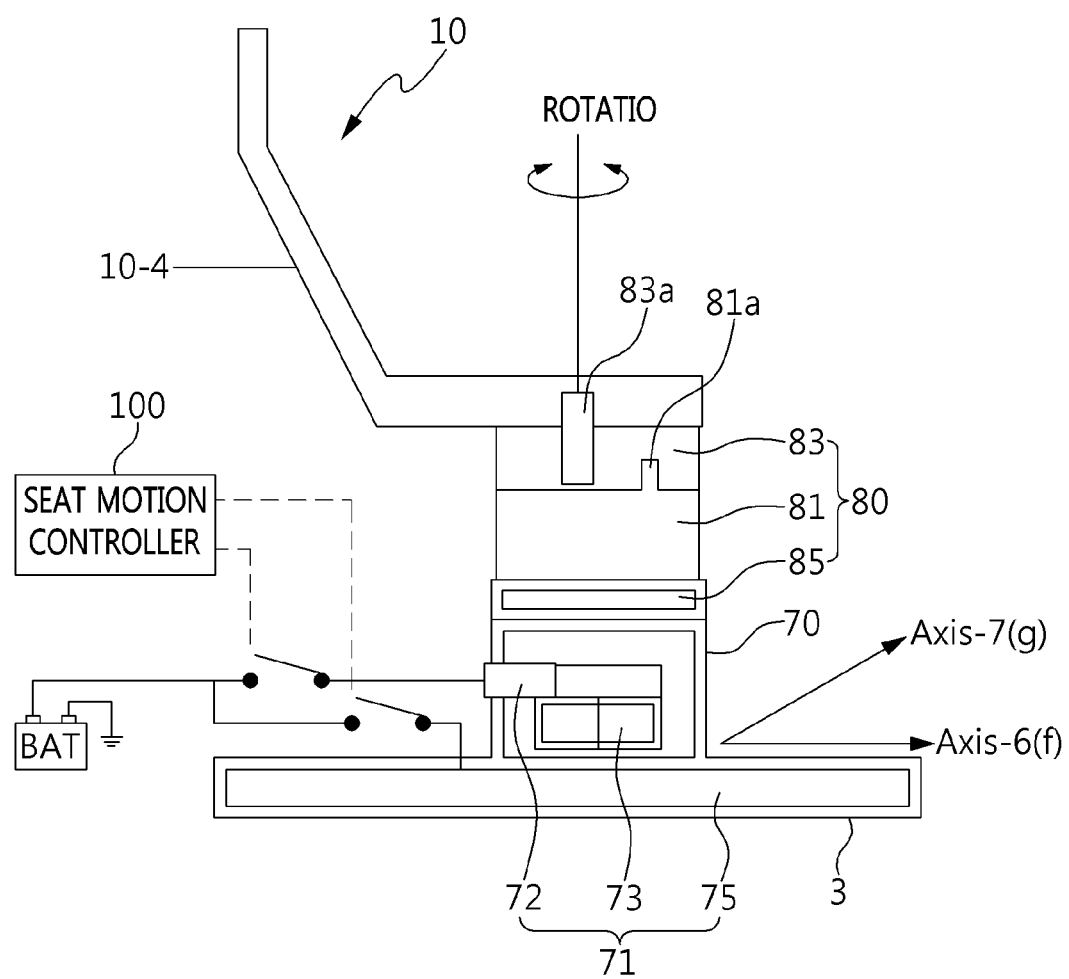
FIG. 9 is a view illustrating a configuration of a seat moving device and a seat rotation device applied to the seat position control system according to an exemplary embodiment of the present disclosure.
Figure 10:
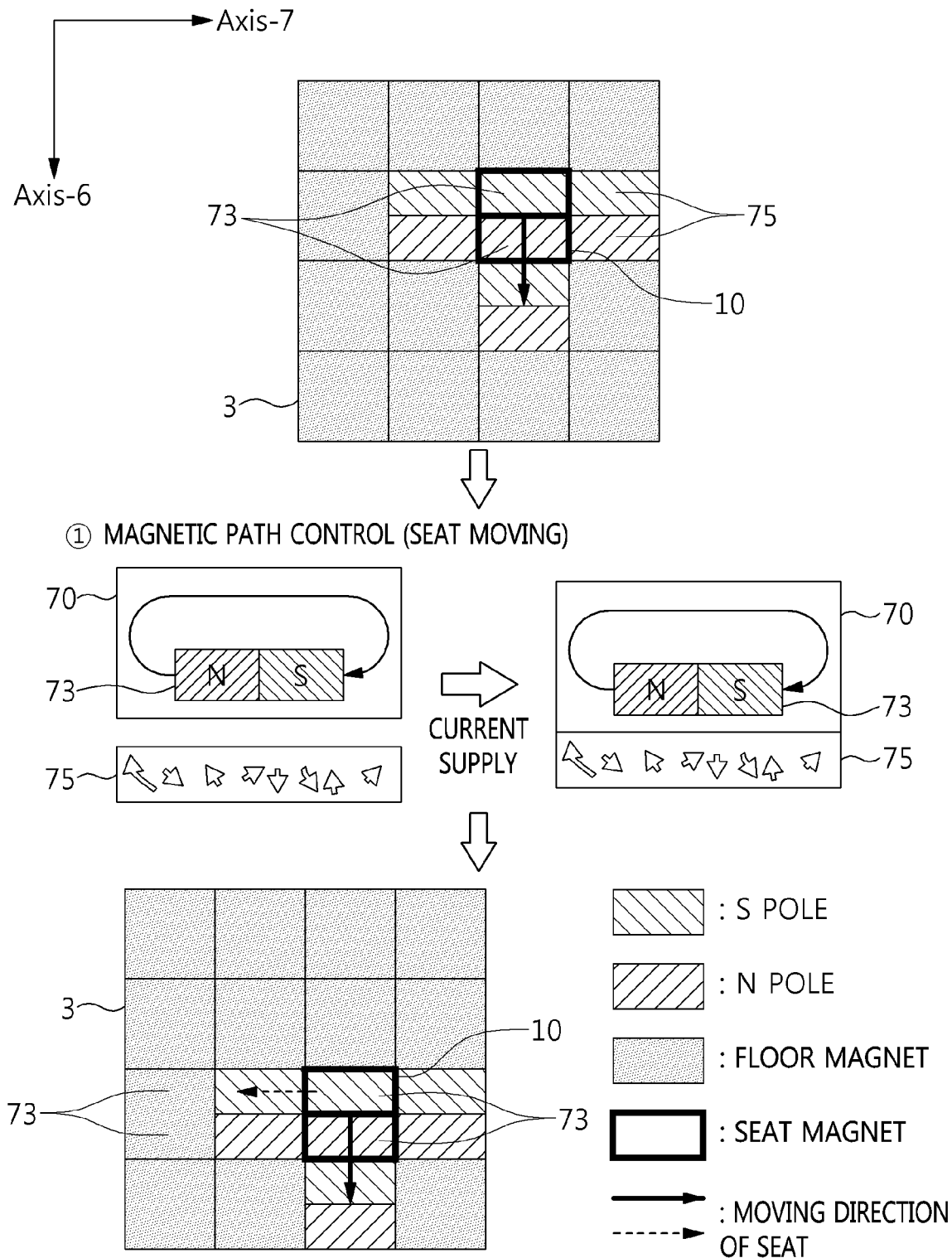
FIG. 10 is a view illustrating an operating status that a position of the gyro seat is moved by a magnetic force of a magnet according to an exemplary embodiment of the present disclosure.
Figure 11:
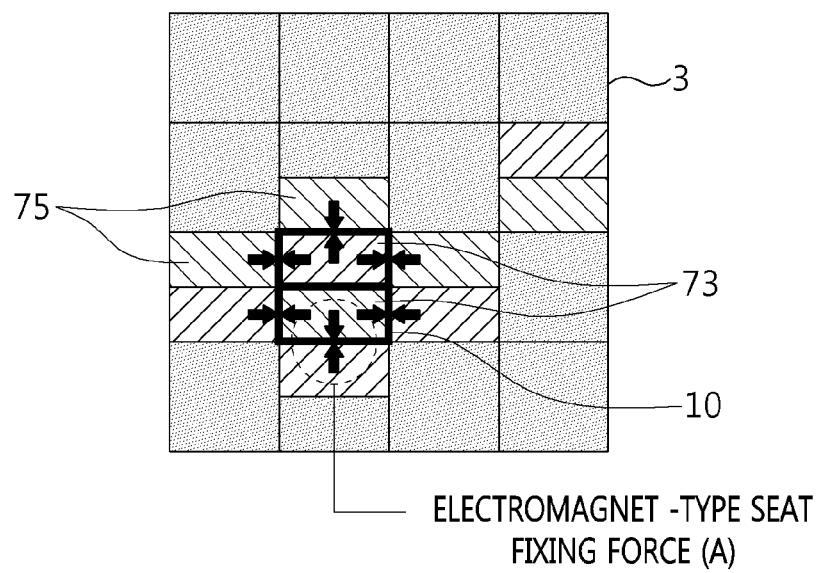
FIG. 11 is a view illustrating an operating status forming double fixing forces at a status that a position of the gyro seat moved by the magnetic force of the magnet according to the present invention is moved by a magnetic force of the magnet.
Figure 11:
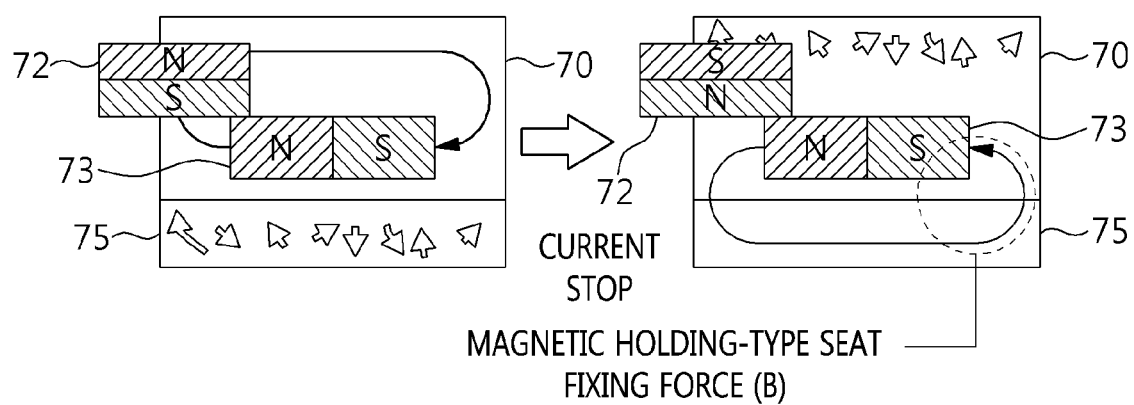

Meanwhile, FIGS. 9 to 11 are views illustrating a detailed operation of the gyro seat 10 through the seat moving device 70 and the seat rotation device 80 of the seat position control system 60 in a driving mode of the vehicle 1. In this case, each of the operating control of the seat moving device 70 for a position movement of the gyro seat 10 and the seat rotation device 80 for the rotation of the gyro seat 10 may be performed when the vehicle 1 passes through the speed bump 1000 as shown in FIG. 6.

Referring to FIG. 9, the seat moving device 70 is arranged under the seat rotation device 80 coupled to a seat frame 10-4 and faces the floor 3. In this case, the seat frame 10-4 provides stiffness of the seat that prevents the movement of the gyro seat 10 at a status mounted to the floor 3. Particularly, the seat moving device 70 controls, by the seat motion controller 100, a position movement in every direction of the gyro seat 10 according to a polarity variation of N and S poles with respect to the floor 3, and the seat rotation device 80 controls a 360-degree rotation of the gyro seat 10 by the seat motion controller 100. Accordingly, the seat frame 10-4 is coupled with a seat moving rail (not shown) for the position movement in every direction of the gyro seat 10. The seat moving rail is the same configuration as that applied to a conventional vehicle seat.

As one embodiment, the seat moving device 70 is interposed between the gyro seat 10 and the floor 3 and is configured as a magnet case coupled to the seat cushion 10-1; and the magnet case comprises a magnet 71 coupled to a battery that a current supply is controlled by the seat motion controller 100. The magnet 71 is configured as a combination of two electromagnets and one permanent magnet.

More specifically, the magnet 71 comprises a seat electromagnet and a floor electromagnet as two electromagnets and a seat permanent magnet 73 as one permanent. Accordingly, each of the seat electromagnet 72 and the floor electromagnet 75 forms an electric circuit supplied with a current of the battery by a control of the seat motion controller 100 and thus may convert a polarity conversion of N pole and S pole, while the seat permanent magnet 73 forms fixed N pole and S pole.

More specifically, the seat permanent magnet 73 is arranged between the seat electromagnet 72 and the floor electromagnet 75 and the seat electromagnet 72 and the seat permanent magnet 73 is configured in the magnet case, while the floor electromagnet 75 is separated from the magnet case and is configured in the floor 3. Particularly, the magnet 71 moves a seat using a repulsive force of N-N or S-S by a combination of the seat electromagnet 72, the seat permanent magnet 73, and the floor electromagnet 75 and fixes a seat using an electromagnet-type seat fixing force by an attractive force of N-S and a magnetic holding-type seat fixing force at the same time, thus preventing a movement by an external load at a fixed status after the position movement of the gyro seat. That is, the magnet 71 forms double fixing forces at a status that the position of the gyro seat 10 is moved. In this case, an ON current signal on each of the seat electromagnet 72 and the floor electromagnet 75 converts N pole into S pole and an OFF current signal converts S pole into N pole; and the ON and Off current signals are controlled to form a repulsive force of N-N/S-S and an attractive force of N-S.

Referring to a moving control the gyro seat 10 by the magnet 71 in FIG. 10, the seat motion controller 100 controls a current supply of a battery to each of the seat electromagnet 72 and the floor electromagnet 75 for the position movement of the gyro seat 10. In this case, the floor electromagnet 75 is formed in the floor 3 so that the N and S poles have a grid pattern; and the grid pattern is arranged along a moving distance in every direction of the gyro seat 10. Accordingly, the gyro seat 10 moves in every direction by forming a repulsive force by the same polarities (N-N or S-S) of the floor electromagnet 75 and the seat permanent magnet 73. Particularly, the floor electromagnet 75 may be configured to be directly formed or added by a separate metal board.

As one embodiment, the seat motion controller 100 controls a current supply to the seat electromagnet 72 and forms S pole with respect to N pole of the seat permanent magnet 73, and thus forms an attractive force by the S pole of the seat electromagnet 72 facing the N pole of the seat permanent magnet 73. As a result, a magnetic path of the magnet 71 is formed between the seat electromagnet 72 and the seat permanent magnet 73. Then, the seat motion controller 100 controls a current supply to the floor electromagnet 75 and forms N pole with respect to N pole of the seat permanent magnet 73, and thus forms a repulsive force by the N pole of the seat permanent magnet 73 facing the N pole of the floor electromagnet 75. The repulsive force releases the fixing force between the gyro seat 10 and the floor 3 and moves the gyro seat 10 from the floor 3 by an external force.

More specifically, the seat motion controller 100 receives, as an input data from the input processor 120, a detected value of the vehicle sensor 5 and displacements, angular velocities, and angular accelerations of the xyz axes of the gyro sensor 33; the main processor 110 generates, as control values, a current supply and a blocking time for forming a polarity of the seat electromagnet 72 and the floor electromagnet 75; and the output processor 130 controls a polarity conversion of N-S or S-N by the ON and OFF current signals for forming a polarity of the seat electromagnet 72 and the ON and OFF current signals for forming a polarity of the floor electromagnet 75.

As a result, such as first and second block diagrams illustrated in a direction of the sixth axis (f) of FIG. 10, an attractive force that S pole of the seat electromagnet 72 faces N pole of the seat permanent magnet 73 is formed and a magnetic path is formed between the seat electromagnet 72 and the seat permanent magnet 73.

Next, such as second and third block diagrams illustrated in a direction of the sixth axis (f) of FIG. 10, a repulsive force that N pole of the floor electromagnet 75 faces N pole of the seat permanent magnet 73 is formed and a fixing force between the gyro seat 10 and the floor 3 is released. As a result, the gyro seat 10 moves, by an external force, from the floor 3 in a direction of the sixth axis (f). In this case, the position movement in the direction of the sixth axis (f) continues by controlling to form the repulsive force by polarities of the grid pattern of the floor electromagnet 75 along the direction of the sixth axis (f) and the seat permanent magnet 73. Further, a position movement in a direction of the seventh axis (g) continues by controlling to form the repulsive force by polarities of the grid pattern of the floor electromagnet 75 along the direction of the seventh axis (g) and the seat permanent magnet 73.

Referring to a fixing control after a position movement of the gyro seat 10 by the magnet 71 in FIG. 11, the seat motion controller 100 controls a current supply of a battery to the seat electromagnet 72 and the grid pattern of the floor electromagnet 75 so as to fix the position movement of the gyro seat 10.

As one embodiment, the seat motion controller 100 controls a current supply to the seat electromagnet 72 and forms N pole with respect to N pole of the seat permanent magnet 73, and thus forms a repulsive force that the N pole of the seat electromagnet 72 faces the N pole of the seat permanent magnet 73. At the same time, the seat motion controller 100 controls a current supply to the floor electromagnet 75 and forms S pole with respect to N pole of seat permanent magnet 73, and thus forms an attractive force that the N pole of the seat permanent magnet 73 faces the S pole of the floor electromagnet 75. Then, a magnetic path of the magnet 71 is formed between the seat permanent magnet 73 and the floor electromagnet 75, not between the seat electromagnet 72 and the seat permanent magnet 73.

As a result, the seat magnet 71 forms, at the same time, an electromagnetic-type seat fixing force (A) (a first block in FIG. 11) according to the attractive force of the seat permanent magnet 73 and the floor electromagnet 75 and a magnetic holding-type seat fixing force (B) (a second block in FIG. 11) according to the forming of the magnetic path of the seat permanent magnet 73 and the floor electromagnet 75 and thus the gyro seat 10 is fixed to the floor 3 at a moved position. Herein, an arrow facing each other indicates an attractive force by N-S or S-N poles. Herein, the magnetic holding-type seat fixing force (B) has the same principle as that of a spaceship docking technology.

Accordingly, when the gyro seat 10 moves in every direction, the output processor 130 of the seat motion controller 100 forms a magnetic path by an attractive force by the opposite polarities of the seat electromagnet 72 and the seat permanent magnet 73, and releases the fixing force of the gyro seat 10 and the floor 3 by a repulsive force by the same polarities of the floor electromagnet 75 and the seat permanent magnet 73. On the other hand, when the gyro seat 10 moves in every direction and then is fixed, the output processor 130 of the seat motion controller 100 blocks the forming of the magnetic path by a repulsive force by the same polarities of the seat electromagnet 72 and the seat permanent magnet 73 and forms the fixing force of the gyro seat 10 and the floor 3 by an attractive force and forming of the magnetic path by the opposite polarities of the floor electromagnet 75 and the seat permanent magnet 73.

Referring to FIG. 9 again, the seat rotation device 80 comprises a rotation motor 81, a gear box 83, and a damper 85. The rotation motor 81 performs a bi-directional rotation by a control of the seat motion controller 100 and is coupled to the gear box 83 by means of a rotation motor axis 81a outputting a torque and thus rotates the gear box 83. The gear box 83 is coupled to the seat frame 10-4 by means of the seat rotation axis 83a outputting a torque and performs a 360-degree rotation of the gyro seat 100. The damper 85 performs a buffering function between the seat rotation device 80 and the seat moving device 70 and is configured as an electronic damper that is made of an elastic material such as a rubber or receives a current supply of a battery by a control of the seat motion controller 100.

As one embodiment, when the gyro seat 10 performs 360-degree rotation by an operation of the seat rotation device 80, the seat motion controller 100 receives, as an input data from the input processor 120, a detected value of the vehicle sensor 5 and displacements, angular velocities, and angular accelerations of the xyz axes of the gyro sensor 33 according to a predetermined seat rotation logic; the main processor 110 generates a control value of the rotation motor 81 according to a rotation range of the gyro seat 10; and the output processor 130 outputs the control value using the PID, and thus the rotation motor 81 rotates and the rotation of the rotation motor 81 rotates the gear box 83 and the seat frame 10-4 rotates. As a result, the gyro seat 10 is rotated by 180-degree rotation and a direction of the gyro seat 10 is converted toward a rear of the vehicle 1.

Figure 12:
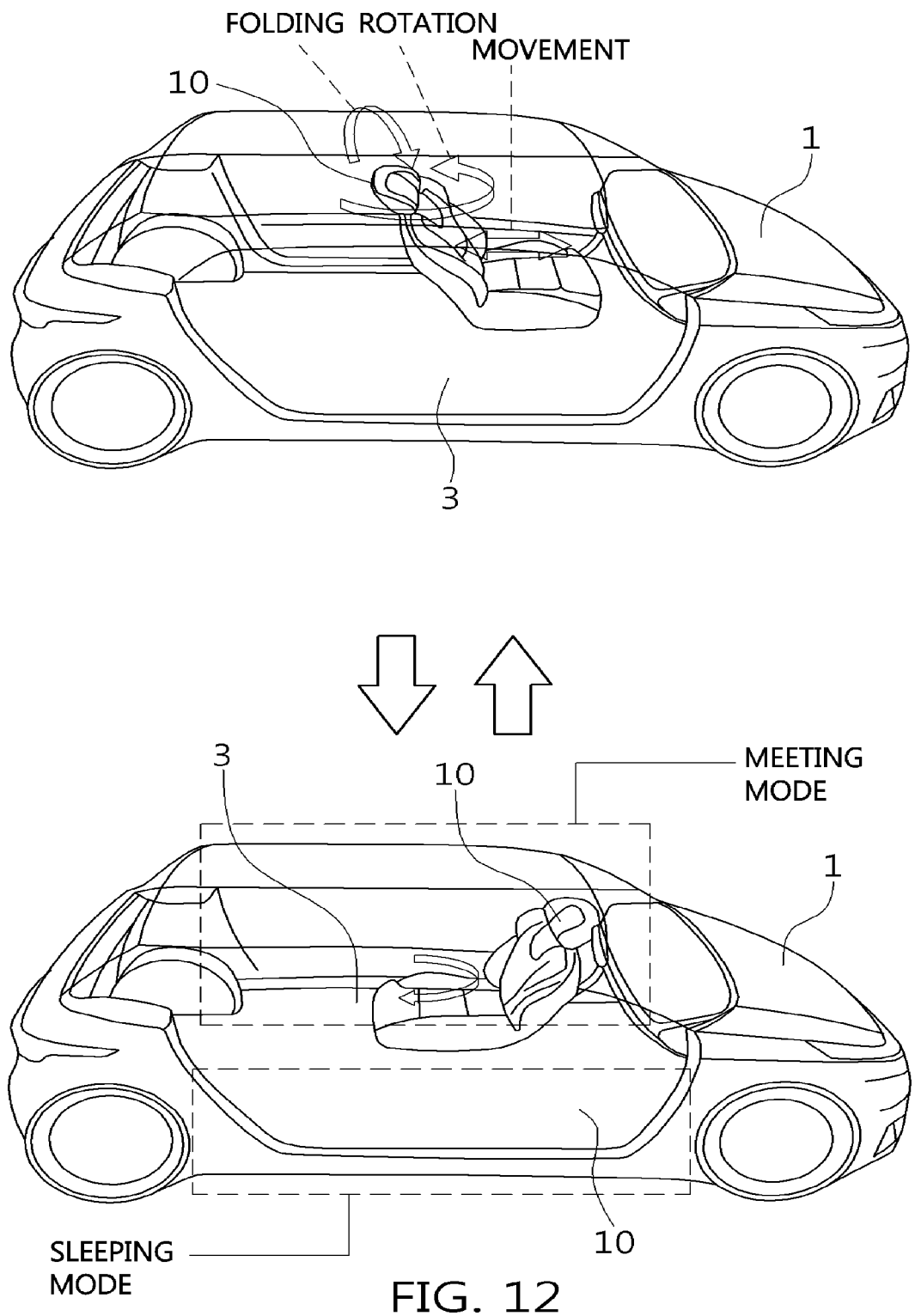
FIG. 12 is a view illustrating an operation status in a meeting mode and a sleeping mode of the gyro seat achieved in the vehicle by the seat position control system according to an exemplary embodiment of the present disclosure.

Meanwhile, FIG. 12 is a view illustrating a meeting mode and a sleeping mode performed through movement, folding, and rotation of the gyro seat 10.

The meeting mode is an embodiment that performs 180-degree rotation of the whole of the gyro seat 10 and converts the gyro seat 10 to face toward a rear of the vehicle 1, and if necessary, performs an operation of the gyro seat 10 that may move in every direction after 180-degree rotation of the gyro seat 10. The sleeping mode is an embodiment that folds the seat back 10-2 of the gyro seat 10 to completely overlap the seat cushion 10-1, and if necessary, performs an operation of pulling the seat leg 10-3 of the gyro seat 10 to the seat cushion 10-1.

As described above, the gyro seat 10 adopted for the vehicle 1 according to an exemplary embodiment of the present disclosure comprises the first, the second, and the third axis seat gyroscopes 31-1, 31-2, 31-3 operating the yaw, the pitch, and the roll varied in a driving mode as the first, the second, and the third axes (a, b, c) and performing the seat posture control of the seat cushion 10-1; the leg actuator 41 operating as the fourth axis (d) for performing the unfolding control of the seat leg 10-3; the folding actuator 51 operating as the fifth axis (e) for performing the folding control of the seat back 10-2; the magnet 71 operating as the sixth and the seventh axes (f, g) for performing the position movement of the seat cushion 10-1 and performing the seat moving control; and the rotation motor 81 for a seat rotation, thus preventing occurrence of motion sickness even in driver's or passenger's behavior of causing motion sickness in an autonomous driving mode and particularly, maximizing convenience of the autonomous driving through diversification of the seat posture control, the seat unfolding control, the seat folding control, and the seat moving control.

What is claimed is:

1. A gyro seat comprising:
   a seat body comprising:
      a seat cushion; and
      a seat back coupled to the seat cushion; and
   a seat gyroscope mounted to the seat body, the seat gyroscope compensating a movement of the seat body by control of first, second and third axes, where the first axis corresponds to a yaw of the seat body as a z axis of an xyz coordinate system, the second axis corresponds to a pitch of the seat body as an x axis of the xyz coordinate system, and the third axis corresponds to a roll of the seat body as a y axis of the xyz coordinate system,
   wherein the seat body further comprises a magnet forming a sixth axis for movement of the x axis and a seventh axis for movement of the y axis,
   wherein the magnet forms, by a repulsive force, a movement of the seat body along the sixth and the seventh axes, and forms, by an attractive force and a magnetic holding altogether, a fixing according to a moving stop of the seat body,
   wherein the magnet comprises:
      an electromagnet with a current supply controlled; and
      a permanent magnet for forming the repulsive force, the attractive force, and the magnetic holding, and
   wherein the electromagnet comprises:
      a seat electromagnet mounted to the seat body; and
      a floor electromagnet facing the seat body in an outside of the seat body, and
   wherein the permanent magnet comprises a seat permanent magnet facing the seat electromagnet and the floor electromagnet.

2. The gyro seat of claim 1, wherein the seat gyroscope comprises:
   a gyro sensor measuring displacement, an angular velocity, and angular accelerations of the first, the second, and the third axes, respectively; and
   a gyro motor whose operation for a seat posture control of the seat body is performed based on the gyro sensor.

3. The gyro seat of claim 2, wherein the seat gyroscope comprises:
   a first axis seat gyroscope operating as the first axis;
   a second axis seat gyroscope operating as the second axis; and
   a third axis seat gyroscope operating as the third axis.

4. The gyro seat of claim 3, wherein each of the first, the second, and the third axis seat gyroscopes comprises a mounting bracket coupled with the seat body.

5. The gyro seat of claim 4, wherein the mounting bracket of the first axis seat gyroscope is coupled in a height direction of the seat body to be the first axis,
   wherein the mounting bracket of the second axis seat gyroscope is coupled in a longitudinal direction of the seat body to be the second axis, and
   wherein the mounting bracket of the third axis seat gyroscope is coupled in a width direction of the seat body to be the third axis.

6. The gyro seat of claim 1, wherein the seat body further comprises:
   a leg actuator forming a fourth axis and controlling an unfolding operation of a seat leg coupled to the seat cushion; and
   a folding actuator forming a fifth axis and controlling a folding operation of the seat back.

7. The gyro seat of claim 1, wherein the seat electromagnet forms N pole and S pole,
   wherein the floor electromagnet forms N pole and S pole as a grid pattern, and
   wherein the grid pattern is arranged in a moving space of the seat body.

8. The gyro seat of claim 7, wherein the current supply to each of the seat electromagnet and the floor electromagnet is controlled for conversion of the N pole and the S pole.

9. The gyro seat of claim 1, wherein the seat permanent magnet is mounted to the seat body and positioned under the seat electromagnet.

10. The gyro seat of claim 1, wherein the seat body comprises a rotation motor generating a torque for rotation of the seat body.

11. The gyro seat of claim 1, wherein the seat body comprises a seat motion controller controlling the seat gyroscope upon variations of the yaw, the pitch, and the roll.

12. A vehicle comprising:
   a gyro seat configured to:
      control a yaw, a pitch, and a roll, respectively varied in a driving mode and performing a seat posture control of a seat cushion,
      perform an unfolding control of a seat leg mounted to the seat cushion; perform a folding control of a seatback mounted to the seat cushion, and
      perform a seat moving control of the seat cushion with respect to a floor;
   a seat motion controller performing the seat posture control the unfolding control, the folding control and the seat moving control;
   a seat electromagnet;
   a floor electromagnet; and
   a seat permanent magnet,
   wherein the seat permanent magnet is interposed between the seat electromagnet and the floor electromagnet, and forms a polarity conversion of N-N poles and N-S poles and a magnetic path conversion for a position movement and a position fixing of the seat moving control.

13. The vehicle of claim 12, further comprising first, second, and third axis seat gyroscopes,
   wherein each of the first, the second, and the third axis seat gyroscopes comprises a gyro sensor detecting variations of the yaw, the pitch, and the roll and a gyro motor controlling the yaw, the pitch, and the roll, and
   wherein the seat motion controller performs the seat posture control by an operating control of the gyro motor based on the gyro sensor.

14. The vehicle of claim 12, further comprising a leg actuator and a folding actuator,
   wherein the seat motion controller performs the unfolding control by an operating control of the leg actuator and the folding control by an operating control of the folding actuator.

15. The vehicle of claim 12, wherein the gyro seat comprises a seat rotation device, and
   wherein the seat rotation device comprises:
      a rotation motor rotated by a control of the seat motion controller;
      a gear box receiving a rotational force of the rotation motor and rotating the gyro seat; and
      a damper added to the rotation motor.

16. The vehicle of claim 12, wherein the seat motion controller comprises:
   an input processor processing, as an input data, varied values of the yaw, the pitch, and the roll and a detected value of the vehicle sensor;

a main processor generating control values for the seat posture control, the unfolding control, the folding control, and the seat moving control; and an output processor outputting the control values.

\* \* \* \* \*